Patented Dec. 13, 1927.

1,652,740

UNITED STATES PATENT OFFICE.

THOMAS P. SHIELDS, OF NEW YORK, N. Y., ASSIGNOR TO SHIELDS & MOORE, OF NEW YORK, N. Y., A FIRM CONSISTING OF THOMAS P. SHIELDS AND G. A. MOORE.

WHITE-GOLD SOLDER.

No Drawing.  Application filed July 24, 1925. Serial No. 45,945.

The present invention relates to a solder for use in connection with white gold, and has for its object to produce a solder which cannot readily be distinguished, after use, from the white gold forming the base of the article made, which solder will have a luster, color, non-tarnishing character and the like similar to those of the white gold used in making up the article, which solder will melt at a sufficiently low temperature to be readily utilizable by manufacturing jewelers, and which will be of good physical strength and adherence, so as to produce joints which are practically indistinguishable, even when subjected to high magnification. A further object is to produce a series of solders, having about the same content of gold as the white gold which is to be used for making up the articles of jewelry and the like.

The alloy of the present case contains as its essential constituents, the following (1) gold, this being present in preferably the same percentage as it is to occur in the white gold used in making up the jewelry, and as well known, white gold may vary from about 10 carat (40%) up to about 19½ carat (82%); (2) nickel, in amount capable of imparting the desired color, namely the color of white gold (3) silver and zinc, which cause the solder to melt at a comparatively low temperature and to produce when molten, a very liquid melt, which can be readily worked. In addition to the above, the alloy may contain if desired, copper in amount equal to about 1 to 10% of the total alloy, this amount of copper does not very substantially alter the properties of the alloy, but can replace an equal amount of gold. In addition to the above, small amounts of manganese, tin or other metals, which are likely to be present as impurities in the metals used, can be present without producing any substantial influence upon properties of the solder.

As it well known, white gold is made up into jewelry, the gold content being from about 10 carat (40%) up to 19½ carat, (82%). Obviously it would be impractical, from a standpoint of cost, to employ a solder containing 70% or so of gold, on jewelry containing only 40% of gold, not only on account of the excessive cost of such a product, but due to the contrasting luster and slightly different color, the solder containing the higher percentage of gold would stand out visibly on the finished article. It may be stated that when the gold pieces have been properly joined by the use of the solder containing substantially the same percentage of gold as the pieces of white gold to be joined, the joints may be hammered without splitting the joint, and after the excess of solder has been filed off and the article polished, the joint will be invisible, even when magnified, as much as 18 diameters.

In order to more fully explain the nature of the invention, I will state that the preferred variations in the metals used in making up solder are as follows:—

45 to 70% fine gold, 4 to 10% nickel, 10 to 25% silver, 10 to 20% zinc.

These proportions are based upon the amounts of the different metals used in making up the solder, and it will be understood that in making up the solder there is likely to be a loss of from 1 to 2%, during the melting operation, this loss be composed chiefly of zinc, and there may also be some loss in the nickel. In making up the solder, all of the metals, in weighed quantities can be placed into a crucible and melted together, a small amount of borax or boric acid being used as a flux and purifying agent. There may be more or less loss of zinc by vaporization, and there may be also some of the nickel oxidized, and the nickel oxide taken up by the flux, and obviously the final alloy will accordingly be usually a little lower in zinc and a trifle lower in nickel, than the original mixture used.

In another mode of preparing the alloys according to the present invention, the silver, zinc and nickel may be melted as an alloy, and the required amount of fine gold or gold containing 10% or so of copper added. In this modification of the process also I prefer to use borax or boric acid as a flux, to take up any oxides formed or present.

While in the above table I have given from 45 to 70 as the preferred content of fine gold, it will be understood that in some cases it may be advisable to vary even more than this, say from about 40% up to 82%, although it is generally not necessary to depart from the limits 45 to 70%. The following specific examples of solders are given, the percentages of the metals being those used in making up the solder, and the percentage of zinc in the final alloy will generally be a little lower than that stated, and the percentage of nickel may also be a trifle lower than that stated:—

*Example 1.*—45% fine gold, 10% nickel, 20% zinc, 25% silver.

*Example 2.*—55% fine gold, 4% nickel, 20% zinc, 22% silver.

*Example 3.*—60% fine gold, 7% nickel, 15% zinc, 20% silver.

*Example 4.*—65% fine gold, 6% nickel, 15% zinc, 15% silver.

*Example 5.*—70% fine gold, 6% nickel, 15% zinc, 10% silver.

*Example 6.*—70% fine gold, 6% nickel, 10% zinc, 15% silver.

In connection with Example 5 and Example 6, these two examples differ from each other in that number 5 contains more zinc and less silver than Example 6. The alloy of number 5 will accordingly have a somewhat lower melting point, and will have rather less strength than number 6. As illustrating the use of these two alloys, I cite the manufacture of a white gold ring. As is usual, gold rings are made by soldering together a number of separate pieces, usually from two to six pieces. After assembling these pieces, by the use of the alloy number 6 as the solder, it is frequently necessary to add on a setting or gallery, which may be conveniently soldered on by the use of the lower melting point solder of Example Number 5. On account of the considerably lower melting point of solder number 5, there is no danger of melting the solder number 6 which was used in soldering the parts of the ring together, by the lower melting point solder of Example number 5 used in soldering on the setting.

In those cases where it is desired to use from 40 to 45% of gold or from 70 to 82% of gold, this can readily be accomplished by maintaining the relative amounts of nickel, zinc and silver approximately the same as in Examples 1 to 6 inclusive, and adding either less or more gold than indicated in the above examples.

I claim:—

1. An alloy suitable as a white gold solder, consisting essentially of the following: gold, 40 to 82%, together with nickel, zinc and silver in proportions of nickel, about 4 to 10 parts; zinc, about 8 to 20 parts; silver, about 10 to 25 parts.

2. An alloy suitable as a solder for white gold, containing as its essential constituents:—nickel, about 10 parts; zinc, about 10 to 15 parts; silver, about 15 to 20 parts; together with such an amount of gold as to give a final alloy of 12 to 14 carats.

3. An alloy as specified in claim 1, containing also small amounts of copper, but not substantially over 10% of copper.

4. An alloy suitable for use as a white gold solder consisting essentially of gold, 45 to 75%; nickel, about 4 to 10%; zinc, about 8 to 20%; silver, about 8 to 25%.

In testimony whereof I affix my signature.

THOMAS P. SHIELDS.